United States Patent [19]
Marcoux

[11] Patent Number: 5,882,176
[45] Date of Patent: Mar. 16, 1999

[54] CHICKEN CAGE STACKER

[76] Inventor: Francois Marcoux, 1234 des Pélicans, Prévost, Qué., Canada, J0R 1T0

[21] Appl. No.: 55,158

[22] Filed: Apr. 3, 1998

Related U.S. Application Data

[60] Provisional application No. 60/043,037 Apr. 7, 1997.
[51] Int. Cl.[6] .................................................. B65G 57/30
[52] U.S. Cl. ........................................ 414/795.3; 53/378.3
[58] Field of Search ................................ 53/376.7, 377.2, 53/377.8, 378.3; 414/795.2, 795.3

[56] References Cited

U.S. PATENT DOCUMENTS

| | | | |
|---|---|---|---|
| 2,904,941 | 9/1959 | Midnight | 414/795.3 X |
| 3,037,645 | 6/1962 | Simpkins | 414/795.2 X |
| 4,006,575 | 2/1977 | Lee | 53/378.3 X |
| 4,042,125 | 8/1977 | Falkinger et al. | 414/795.2 X |

*Primary Examiner*—Janice L. Krizek
*Attorney, Agent, or Firm*—Eric Fincham

[57] ABSTRACT

A poultry cage stacker for stacking poultry cages having side walls with an outwardly extending portion and a hinged cover which stacking apparatus comprises a conveyor and a frame mounted about a portion of the conveyor, the frame carrying a cage positioning mechanism to retain the cage in a desired position, a cage lifting device designed to engage the outwardly extending portions of the side walls of the cages, a cage retaining mechanism moveable from a first retracted position to a second cage engaging position, and a member to close the cover of the cage. The apparatus is a compact one which facilitates the stacking of empty poultry cages.

5 Claims, 3 Drawing Sheets

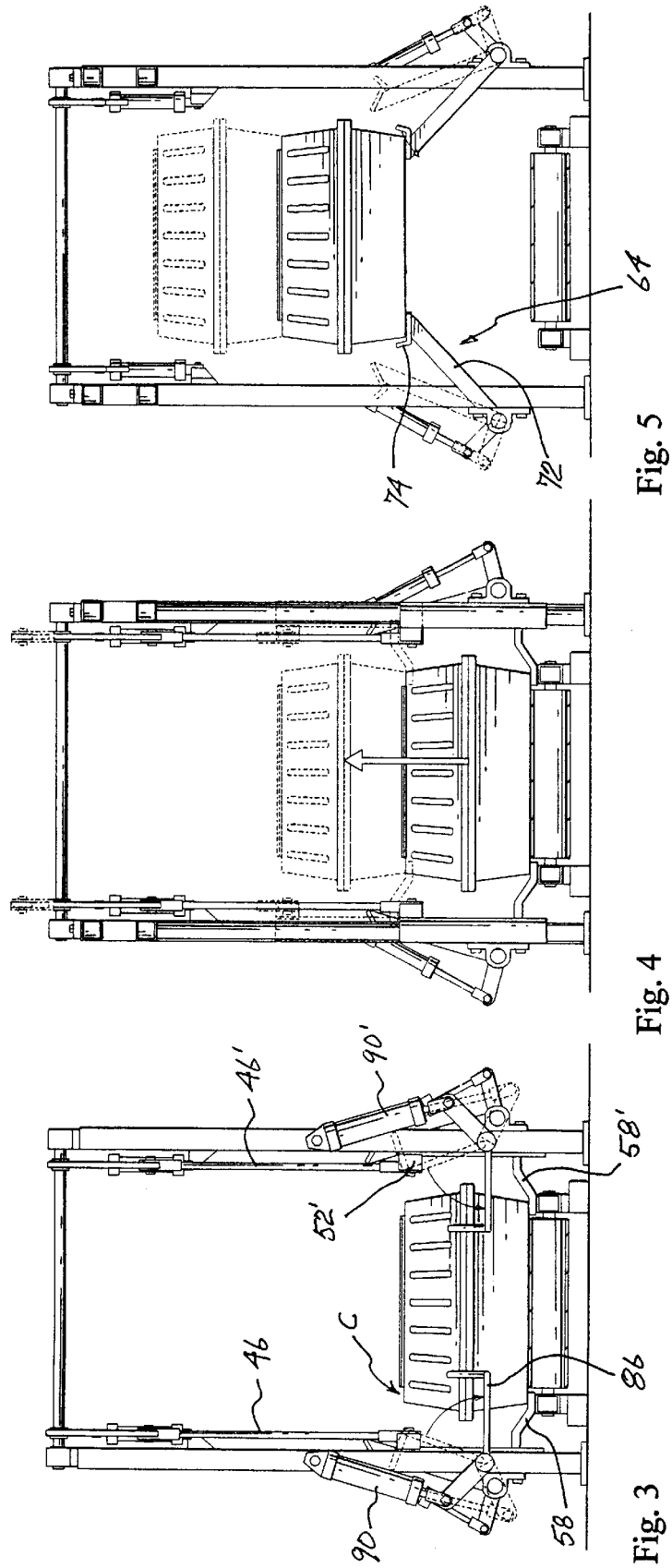

CHICKEN CAGE STACKER

This application claims benefit of USC Provisional Appl. Ser. No. 60/043,037, filed Apr. 7, 1997.

BACKGROUND OF THE INVENTION

The present invention relates to a stacker apparatus and more particularly, relates to a stacker apparatus suitable for stacking poultry cages.

Poultry cages are widely used for transporting chickens from the farm to the slaughterhouse. Inherently, the cages must be recycled by returning them from the slaughterhouse for reuse. At the present time, most of the cages are manually stacked for return shipping. This process is labour intensive and thus relatively expensive.

While there have been various proposals in different arts relating to means for stacking articles, many of these are relatively complex systems not suitable for the purpose of the present invention.

SUMMARY OF THE INVENTION

It is an object of the present invention to provide a stacker apparatus suitable for automatically stacking containers and particularly poultry cages.

It is a further object of the present invention to provide a stacker apparatus wherein the poultry cages may be placed on a conveyor and automatically stacked after unloading of the cages.

According to one aspect of the present invention, there is provided a poultry cage stacking apparatus for poultry cages having side walls and a hinged cover comprising a conveyor; a frame mounted about a portion of the conveyor; cage positioning means mounted on the frame to retain a cage in a desired position on the conveyor upon movement of the conveyor; cage lifting means mounted on the frame, the cage lifting means being designed to engage the outwardly extending portions on opposed side walls of a cage on the conveyor and lift the cage; cage retaining means on either side of the conveyor, the cage retaining means being moveable from a first retracted position to a second cage engaging position to support a cage at a desired height; and means to close the cover of the cage prior to the cage contacting the cage positioning means.

Preferably, the cage stacking apparatus has cage retaining means which comprise first and second cage retaining assemblies mounted on opposite sides of the conveyor, each cage retaining assembly comprising a horizontal shaft mounted on the frame, at least one arm extending outwardly from the horizontal shaft, a cage retaining member mounted on a distal end of the side arm, and means for rotating the horizontal shaft to move the cage retaining means between the first retracted position and the second cage engaging position.

Preferably, the cage stacking apparatus has means for rotating the horizontal shaft which comprise a cylinder having one end mounted to the frame and a second end thereof mounted to the horizontal shaft.

Preferably, the cage stacking apparatus has means for lifting a cage which comprise a cage lifting assembly on either side of the conveyor, each of the cage lifting assemblies comprising a pair of stanchions, the lifting assembly being mounted on the stanchions, a lift arm, a tilt arm mounted at one end thereof to a rotatable shaft and at a further end thereof to the lift arm, and means for moving the tilt arm to thereby move the lift arm in a vertical direction.

Preferably, the cage stacking apparatus has means for retaining a cage which comprise first and second cage retaining assemblies mounted on opposed sides of the conveyor, each cage retaining assembly comprising an arm moveable into a first retaining position whereby the arm prevents further movement of a cage on the conveyor, and a second retracted position to permit passage of a cage along a conveyor, the arm being attached to a rotatable shaft, and means for rotating the shaft to cause the arm to move between the first and second positions.

In greater detail, the present invention provides a poultry cage apparatus which is a self contained unit and may be used with a minimum of floor space being occupied.

The construction of the poultry cage stacking apparatus of the present invention may be any conventional structure in respect of the frame and various components thereof. Similarly, the use of a suitable control apparatus for actuating the different movements need not be discussed in detail herein as it is well within the skill of those knowledgeable in the art to provide the different signals and to process the signals to actuate the cage positioning means, cage lifting means and cage retaining means.

As the weights involved are not substantial, one may use either pneumatic or hydraulic actuators as desired.

The apparatus is designed to be used with poultry cages which are relatively standard in the industry and which have a middle section with an outwardly extending portion (at the point of joinder of top and bottom portions) along with a hinged cover for providing access to the interior of the cages.

BRIEF DESCRIPTION OF THE DRAWINGS

Having thus generally described the invention, reference will be made to the accompanying drawings illustrating an embodiment thereof, in which:

FIG. 3 is a sectional view taken along the line 3—3 of FIG. 2;

FIG. 4 is a sectional view taken along the line 4—4 of FIG. 2; and

FIG. 5 is a sectional view taken along the line 5—5 of FIG. 2.

DESCRIPTION OF THE PREFERRED EMBODIMENTS

Figure 1:
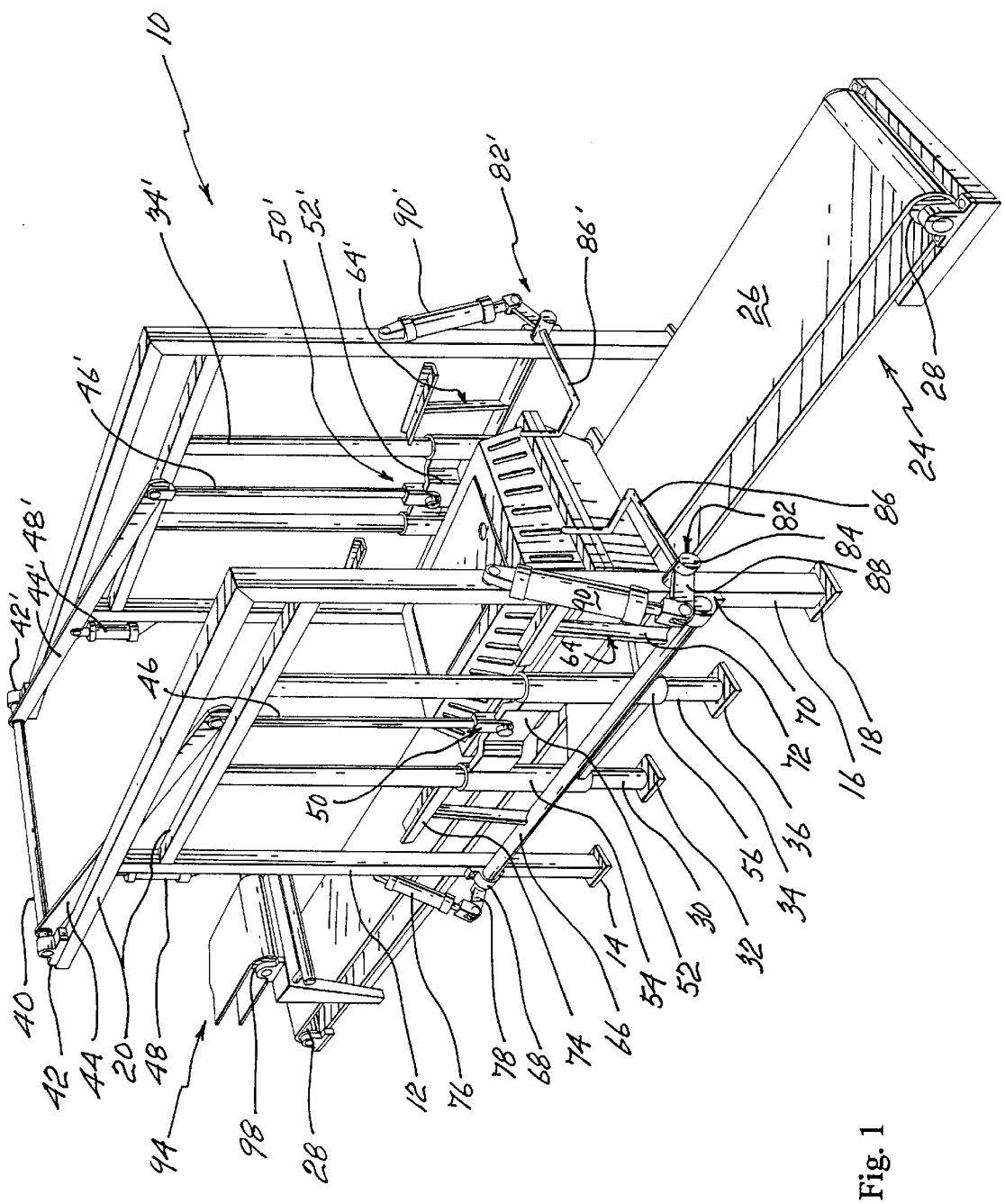
FIG. 1 is a perspective view of a poultry cage stacking apparatus according to the present invention.

Referring to the drawings in greater detail and by reference characters thereto, there is illustrated a poultry cage stacker apparatus which is generally designated by reference numeral 10. Poultry cage stacker apparatus 10 is substantially symmetrical about a longitudinal axis extending along a lower conveyor 24 and thus, only one side of the apparatus will be described in detail herein. Similar reference numerals with a prime are used for the opposite side.

Poultry cage stacker apparatus 10 has a first vertical frame member 12 terminating at its lower extremity in a foot pad 14. Similarly, at an opposed end there is provided a second vertical frame member 16 seated on foot pad 18. Horizontal frame members 20 interconnect vertical frame members 12 and 16.

Lower conveyor 24 includes a conveyor belt 26 rotatably journaled about rollers 28. A suitable drive means (not shown) is provided.

Intermediate vertical frame members 12 and 16 are a pair of vertical posts 30, 34, each terminating in a foot pad 32, 36.

A cage lifting assembly includes a horizontal shaft 40 mounted rearwardly on an upper horizontal frame member 20; horizontal shaft 40 is mounted in bearing assemblies 42, 42'. Secured to horizontal shaft 40 are a pair of pivot arms 44, 44' each of which is rotatably secured to a respective lifter arm 46, 46'.

Mounted on vertical frame member 12 is a cylinder 48 and which cylinder 48 is secured to lifter arm 46. A similar arrangement is provided on the other side with cylinder 48' being mounted on vertical frame member 12' and secured to pivot arm 44'.

A horizontal member 52 is secured to lifter arm 46 and has, at either end thereof, a sleeve 54 and 56. Sleeves 54 and 56 are in sliding engagement with vertical posts 30 and 34 respectively.

In turn, a cage lifting element 58 is secured to sleeves 54 and 56 and extends inwardly towards lower conveyor 24.

Stacker apparatus 10 also includes cage retaining assemblies 64, 64' each of which comprises a horizontal shaft 66 which is secured to and extends between vertical frame members 12 and 16 by means of bearing assemblies 68 and 70 respectively. Extending outwardly from horizontal shaft 66 are a pair of mounting members 72 carrying cage retaining elements 74 at a distal end thereof. Horizontal shaft 66 is rotatably driven by means of a cylinder 76 mounted on vertical frame member 12 and secured to a shaft extension 78.

A cage positioning assembly comprises a shaft 84 mounted on vertical member 16 and which carries a stopping member 86. Shaft 84 may be rotatably driven by means of a cylinder 90 which is also secured to vertical post 16 and to a connecting member 88.

At the input end of lower conveyor 24, there is provided an upper conveyor 94 which is designed to discharge cages C onto lower conveyor 24. Upper conveyor 94 is only partially illustrated; upper conveyor 94 includes a conveyor belt 96 entrained about roller 98. At the discharge end of conveyor belt 96, there is provided a cage closing member 100 for reasons which will become apparent hereinbelow.

Figure 2:
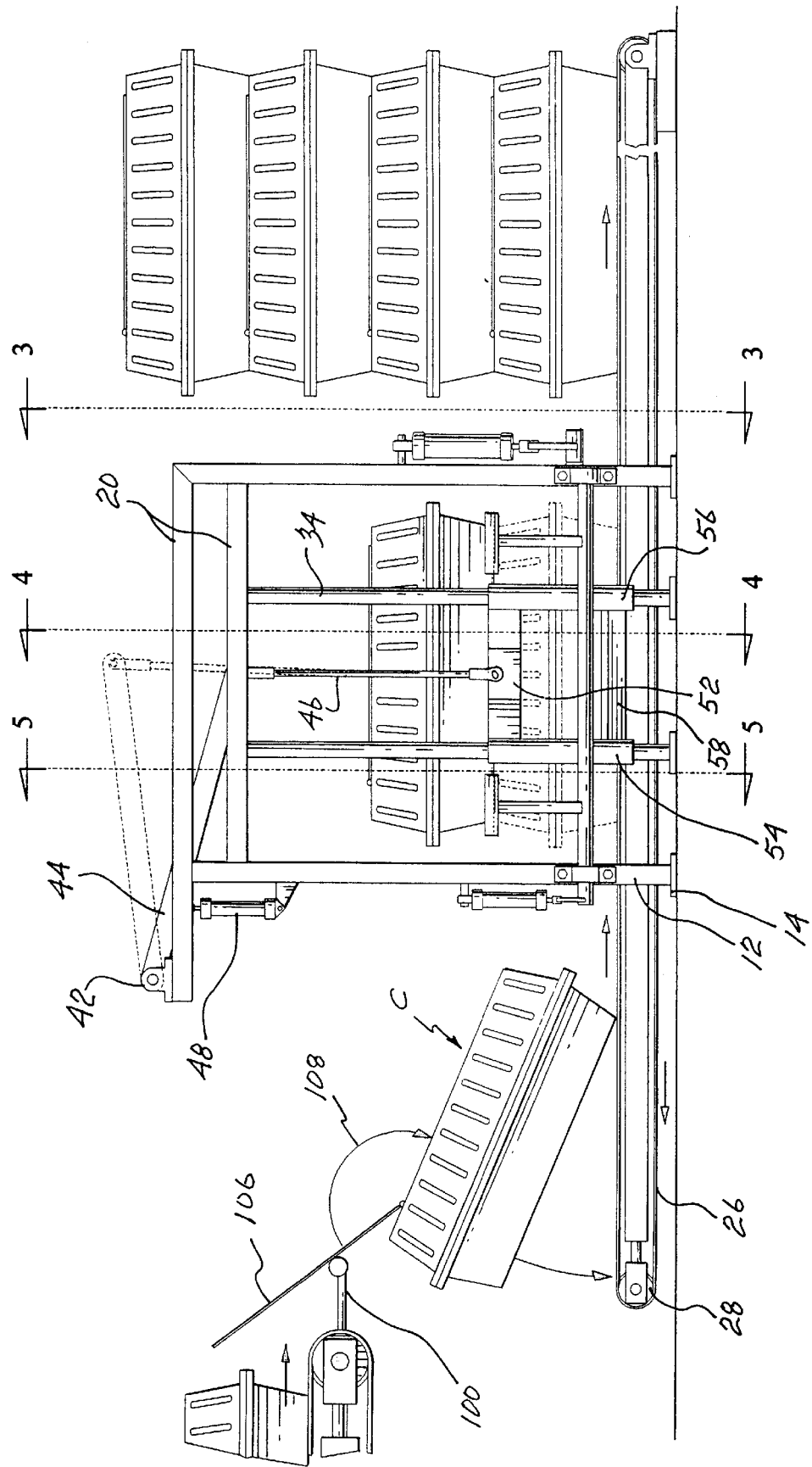
FIG. 2 is a side elevational view thereof.

In operation, and referring to FIGS. 1 and 2, a cage C on upper conveyor 94 is delivered to lower conveyor 24. As it moves downwardly to conveyor 24, closing member 100 engages cover 106 and with the momentum, cover 106 is directed as shown by arrow 108 to a closed position. Referring to FIG. 1 which illustrates cage C being moved into position along belt 26 of conveyor 24, stopping members 86, 86' are positioned to retain cage C in a desired position.

At this point in time, lifting assemblies 50 and 50' are actuated with cage lifting elements 58, 58' engaging the side of cage C from underneath. Actuation of cylinders 48, 48' on pivot arms 44, 44' will cause upward movement of lifter arms 46, 46' and the cage will be lifted to the position shown in FIG. 2. At a certain height, cage retaining assemblies 64, 64' are actuated such that cage retaining elements 74, 74' are designed to support the flanges of cage C. Lifting assembly 50 is then lowered with cage C being supported by cage retaining elements 74.

At this point, a further cage is moved into position and the process repeated.

When the desired number of cages are stacked, cage positioning assemblies 82, 82' are activated through cylinders 90, 90' to move stopping members 86, 86' out of the retaining position such that the cages may be moved to the right as shown in FIG. 2.

It will be understood that the above described embodiment is for purposes of illustration only and that changes and modifications may be made thereto without departing from the spirit and scope of the invention.

I claim:

1. A poultry cage stacking apparatus for poultry cages having side walls and a hinged cover comprising:

a) a conveyor;

b) a frame mounted about a portion of said conveyor;

c) cage positioning means mounted on said frame to retain a cage in a desired position on the conveyor upon movement of the conveyor;

d) cage lifting means mounted on said frame, said cage lifting means being designed to engage outwardly extending portions on opposed side walls of a cage on the conveyor and lift said cage;

e) cage retaining means on either side of said conveyor, said cage retaining means being moveable from a first retracted position to a second cage engaging position to support a cage at a desired height; and f) means to close said cover of said cage prior to said cage contacting said cage positioning means.

2. The cage stacking apparatus of claim 1 wherein said cages have side walls with outwardly extending portions and said cage retaining means comprises first and second cage retaining assemblies mounted on opposite sides of said conveyor, each cage retaining assembly comprising a horizontal shaft mounted on said frame, at least one arm extending outwardly from said horizontal shaft, a cage retaining member mounted on a distal end of said one arm, and means for rotating said horizontal shaft to move said cage retaining means between said first retracted position and said second cage engaging position.

3. The cage stacking apparatus of claim 2 wherein said means for rotating said horizontal shaft comprises a cylinder having one end mounted to said frame and a second end thereof mounted to said horizontal shaft.

4. The cage stacking apparatus of claim 1 wherein said cage lifting means comprises a cage lifting assembly on either side of said conveyor, each of said cage lifting assemblies comprising a pair of stanchions, said lifting assembly being mounted on said stanchions, a lift arm, a tilt arm mounted at one end thereof to a rotatable shaft and at a further end thereof to said lift arm, and means for moving said tilt arm to thereby move said lift arm in a vertical direction.

5. The cage stacking apparatus of claim 1 wherein said cage positioning means comprises first and second cage positioning assemblies mounted on opposed sides of the conveyor, each cage positioning assembly comprising an arm moveable into a first retaining position whereby the arm prevents further movement of a cage on said conveyor, and a second retracted position to permit passage of a cage along said conveyor, said arm being attached to a rotatable shaft, and means for rotating said shaft to cause said arm to move between said first and second positions.

* * * * *